(12) United States Patent
Chia et al.

(10) Patent No.: US 9,915,539 B2
(45) Date of Patent: Mar. 13, 2018

(54) INTELLIGENT VIDEO NAVIGATION FOR AUTOMOBILES

(71) Applicant: CONTINENTAL AUTOMOTIVE GMBH, Hanover (DE)

(72) Inventors: Wei Ming Dan Chia, Singapore (SG); Chuan Hock Lim, Singapore (SG); Bee Ching Kong, Singapore (SG)

(73) Assignee: Continental Automotive GmbH, Hannover (DE)

( * ) Notice: Subject to any disclaimer, the term of this patent is extended or adjusted under 35 U.S.C. 154(b) by 58 days.

(21) Appl. No.: 14/769,274

(22) PCT Filed: Feb. 25, 2013

(86) PCT No.: PCT/IB2013/051496
§ 371 (c)(1),
(2) Date: Aug. 20, 2015

(87) PCT Pub. No.: WO2014/128532
PCT Pub. Date: Aug. 28, 2014

(65) Prior Publication Data
US 2016/0010998 A1 Jan. 14, 2016

(51) Int. Cl.
*G01C 21/34* (2006.01)
*G01S 19/13* (2010.01)
*H04N 5/247* (2006.01)
*H04N 5/33* (2006.01)
(Continued)

(52) U.S. Cl.
CPC ............ *G01C 21/34* (2013.01); *G01C 21/12* (2013.01); *G01C 21/26* (2013.01);
(Continued)

(58) Field of Classification Search
CPC ........ G01C 21/12; G01C 21/26; G01C 21/34; G01C 21/3602; G01S 19/13; H04N 5/247; H04N 5/33; H04N 7/181
(Continued)

(56) References Cited

U.S. PATENT DOCUMENTS 6,735,519 B1 5/2004 Han
2005/0002558 A1 1/2005 Franke et al.
(Continued)

FOREIGN PATENT DOCUMENTS

CN 1815142 8/2006
CN 102565832 7/2012
(Continued)

OTHER PUBLICATIONS

Search Report dated Nov. 18, 2016 which issued in the corresponding European Patent Application No. 13875994.9.
(Continued)

*Primary Examiner* — Khoi Tran
*Assistant Examiner* — Robert Nguyen
(74) *Attorney, Agent, or Firm* — Cozen O'Connor (57) ABSTRACT

A method of vehicle navigation guidance includes: receiving at least three satellite positioning data; receiving road marking data from a driver assistance device; calculating a first position of a vehicle according to the at least three satellite positioning data and according to the road marking data; determining a turning action of the vehicle according to the road marking data; determining an acceleration force of the vehicle according to the road marking data; and calculating a second position of the vehicle according to the first position, according to the turning action, and according to the acceleration force.

16 Claims, 6 Drawing Sheets

(51) Int. Cl.
 *H04N 7/18* (2006.01)
 *G01C 21/26* (2006.01)
 *G01C 21/12* (2006.01)
 *G01C 21/36* (2006.01)

(52) U.S. Cl.
 CPC .......... *G01C 21/3602* (2013.01); *G01S 19/13* (2013.01); *H04N 5/247* (2013.01); *H04N 5/33* (2013.01); *H04N 7/181* (2013.01)

(58) Field of Classification Search
 USPC .................................................. 701/461, 268
 See application file for complete search history.

(56) References Cited

U.S. PATENT DOCUMENTS

| | | | |
|---|---|---|---|
| 2005/0004753 A1* | 1/2005 | Weiland | G01C 21/32 701/532 |
| 2009/0012709 A1 | 1/2009 | Miyazaki | |
| 2010/0131197 A1 | 5/2010 | Zhang et al. | |
| 2012/0116676 A1 | 5/2012 | Basnayake et al. | |
| 2013/0173232 A1* | 7/2013 | Meis | G06K 9/00798 703/2 |
| 2015/0210274 A1* | 7/2015 | Clarke | B60W 30/00 382/104 |
| 2015/0354976 A1* | 12/2015 | Ferencz | G01C 21/3602 382/104 |
| 2015/0377634 A1 | 12/2015 | Atsmon et al. | |

FOREIGN PATENT DOCUMENTS

| | | |
|---|---|---|
| CN | 102567449 | 7/2012 |
| CN | 102666262 | 9/2012 |
| CN | 102770739 | 11/2012 |
| DE | 10024816 | 3/2001 |
| DE | 102009017731 | 11/2009 |
| EP | 1498862 | 1/2005 |
| EP | 2003423 | 12/2008 |
| EP | 2 450 667 | 5/2012 |
| EP | 2469230 | 6/2012 |
| GB | 2479983 | 11/2011 |
| JP | 2007-246023 A | 9/2007 |
| JP | 2009-083743 A | 4/2009 |
| JP | 2009-289105 A | 12/2009 |
| KR | 10 2004-0011946 A | 2/2004 |
| KR | 10-2007-0101562 A | 10/2007 |
| WO | WO 2009/098154 | 8/2009 |
| WO | WO 2009/148319 | 12/2009 |
| WO | WO 2011/042876 | 4/2011 |

OTHER PUBLICATIONS

Office Action dated Jan. 4, 2017 which issued in the corresponding Chinese Patent Application No. 201380073681.8.
Search Report dated Mar. 31, 2017 which issued in the corresponding European Patent Application No. 13875994.9.

\* cited by examiner

Flow Chart 2

INTELLIGENT VIDEO NAVIGATION FOR AUTOMOBILES

CROSS-REFERENCE TO RELATED APPLICATIONS

This is a U.S. national stage of application No. PCT/IB2013/051496, filed on 25 Feb. 2013 the content incorporated herein by reference.

BACKGROUND OF THE INVENTION

1. Field of the Invention

This application relates to a navigation device for providing route guidance for an automobile.

2. Related Art

Many automobiles have navigation systems for aiding its drivers to reach their destination. Each navigation system has a Global positioning system (GPS) receiver with a gyroscope and with an accelerometer. The GPS receiver receives signals from a few GPS satellites to provide location information of the automobile. The gyroscope detects turning actions of the automobile while the accelerometer detects and provides acceleration force of the automobile.

SUMMARY OF THE INVENTION

It is an object of the application to provide an improved vehicle navigation device.

The application provides a method of providing navigation guidance for a vehicle. The vehicle is used for transporting human beings or goods. The navigation guidance often uses audio and visual techniques to provide directions to the driver for assisting the driver to reach his desired destination.

In one aspect of the present invention, the method includes a first step for collecting data of the vehicle, a second step for determining a first position of the vehicle, and a third step for determining a second position of the vehicle.

The first step for collecting data of the vehicle includes receiving at least three satellite positioning data from at least three corresponding positioning satellites. The first step also includes receiving road marking data from a driver assistance device of the vehicle. The driver assistance device is also known as an Advanced Driver Assistance System (ADAS). The driver assistance device has image sensors that can include visual camera sensors and radar sensors. The road marking data can refer to road lane arrow marking data, to road lane marking data, to road boundary marking data, or to road direction turning data.

After the first step, the second step for determining a first position of the vehicle is performed. The second step comprises calculating a first position of a vehicle according to the received satellite positioning data and to the received road marking data. For most purposes, data from three satellites is used to determine the first position of the vehicle while data from a fourth satellite can be used to verify the position determined by the three satellites and to correct any error in the determined position.

The third step for determining a second position of the vehicle is then performed after the second step. This third step includes determining a turning action of the vehicle according to the road marking data. In other words, this third step determines whether the vehicle is turning to the left or is turning to the right.

This step of determining the turning action is intended for improving positional accuracy while saving or avoiding cost of a gyroscope, which can be used to determine turning actions. By avoiding the use of the gyroscope, this step of determining saves the cost of implementing a gyroscope.

This third step also includes determining an acceleration force of the vehicle according to the road marking data. The magnitude of the acceleration force of the vehicle can be used to determine the speed of the vehicle while the direction of the acceleration force of the vehicle can be used to determine the inclination of the vehicle.

The speed and the inclination of the vehicle can then be used to differentiate between stacked parallel roads. By determining the acceleration force from the road marking data, this step is unlike most others that use the accelerometer to determine the acceleration force. In other words, this step of determining avoids the use of the accelerometer and thus saves the cost of the accelerometer.

A second position of the vehicle is then calculated according to the first position, to the turning action, and to the acceleration force.

In short, this method usually may not require additional hardware as the driver assistance devices is readily available in certain vehicles. The method provides vehicle navigation guidance in a covered facility where the vehicle cannot receive satellite signals. This method is also able to differentiate or distinguish between two stacked parallel roads. Most other methods of navigation that uses only satellite signals are unable to differentiate between stacked parallel roads. This method avoids use of a gyroscope and also avoids use of an accelerometer, wherein the gyroscope is often conventionally used to detect turning actions of a vehicle while the accelerometer is often conventionally used to detect and to provide acceleration force of the vehicle. Use of these devices would increase cost of the navigation guidance device.

The method often includes a step of determining or detecting a changing of road lane of the vehicle according to the road marking data. The road marking data is used to determine the changing of road lanes of the vehicle. Most navigation devices that uses data just from the satellite positioning data are unable to determine the changing of the vehicle road lanes because the satellite positioning data is often not accurate enough to determine the road lane on which the vehicle is positioned.

The method can include a step of generating a map database. This step comprises receiving image data from the driver assistance device. After this, one or more data of objects that surround the vehicle are detected in the image data. Position data corresponding to the detected object are later assigned to the detected object data. The object data with the corresponding position data are afterward stored in a memory device. A collection of the object data with the respectively position data later forms the map database.

The detecting of the object data can comprise a step of detecting a bus stop or of detecting a building of interest, such as a petrol station, although other type of objects, such as road marking and road signage, can also be detected.

The method can include the step of a route video conferencing. The vehicle can be in a location for which a navigation device of the vehicle does not have map data. This step then allows the driver of the vehicle to receive route guidance from a remote route guidance provider. This step comprises transmitting an image data of the surroundings of the vehicles to a routing service location. The image data can comprise a photograph or video information. The image data is later received by the routing service location.

A routing guidance according the received image data is then transmitted from the routing service location back to the vehicle.

The application, according to one aspect of the invention, provides a vehicle navigation device for providing route guidance.

The vehicle navigation device comprises a satellite positioning data receiver, an image data receiving port for connecting to a vehicle driver assistance device, a navigation display port, and a navigation audio port. The driver assistance device is also known as an Advanced Driver Assistance System. The vehicle navigation device also comprises a processor that is connected communicatively to the satellite positioning data receiver, to the driver assistance device image data receiver port, to the display port, and to the audio port.

The vehicle navigation device provides a data collection mode, a first position determination mode, and a second position determination mode.

In the data collection mode, the satellite positioning data receiver receives at least three satellite positioning data from at least three corresponding satellites while the image data receiving port obtains road marking data from the driver assistance device.

In the first position determination mode, the processor calculates a first position of a vehicle according to the received satellite positioning data and the received road marking data.

In the second position determination mode, the processor determines at least one turning action of the vehicle according to the road marking data, and the processor determining at least one acceleration force of the vehicle according to the road marking data. The processor then calculates a second position of the vehicle according to the calculated first position, to the determined turning action, and to the determined acceleration force.

The second position determination mode often comprises the step of the processor determining a tilt of the vehicle according to a direction of the acceleration force.

The vehicle navigation device can provide a map generation mode. In the map generation mode, the processor receives image data from the driver assistance device image data receiving port. The processor then detects at least one data of an object in the image data, wherein the object is positioned in the surrounding of the vehicle. After this, the processor assigns position data to the respective detected object data. The processor later stores the object data with the position data.

The application also provides a vehicle. The vehicle comprises a driver assistance device and the above navigation device being connected to the driver assistance device. The driver assistance device comprises at least two vision image sensors for providing image data.

Different implementations of the vision image sensors are possible. In one implementation, the vision image sensors comprise an infrared sensor. In another implementation, the vision image sensors comprise a camera sensor.

The driver assistance device often includes at least two radar image sensors for providing image data. One radar image sensor can be provided at a left side of the vehicle while the other radar image sensor can be provided at a right side of the vehicle.

The image data can comprise road marking data, such as road lane arrow marking data, road lane marking data, road boundary marking data, or road direction turning data.

The image data often include data of objects that are surrounding the vehicle.

In summary, the application provides a navigation device for an automobile or vehicle. The navigation device includes a Global Positioning System (GPS) receiver, vision sensors and radar sensors, and a memory device. The vision sensors and the radar sensors can be a part of a component of the automobile, known as an Advance Driver Assistance System (ADAS). The memory device has map data as well as other information.

In use, the navigation device is installed in the automobile. The automobile travels on roads to transport goods and people.

The navigation device uses information from the ADAS and information from the GPS receiver to aid navigation of the automobile.

The ADAS provides digital images of the surroundings of the automobile. The digital images comprise digital visual images and digital radio wave images. The vision sensors provide the digital visual images, which relate to objects placed in front of the vision sensors. Similarly, the radar sensors provide the digital radio wave images, which relate to objects placed in front of the radar sensors.

The GPS receiver receives signals from a few GPS satellites for providing location information of the automobile.

In one aspect of the application, both the GPS receiver location data and the ADAS image data are used to determine the location of the automobile. The GPS receiver location data is used to determine the area in which the automobile is located. The ADAS image data is used to determine in which part of the area the vehicle is positioned. This is unlike most other navigation units, which provide location data with this resolution.

In one example, the GPS receiver location data is used to determine the part of a road in which the automobile is located. The ADAS image data is used to determine on which lane of the road the vehicle is positioned. The ADAS image data can be used to detect changes of the road lanes.

The navigation device also provides a Personalized Map Data (PMD) to complement the map data. As the expressway that the vehicles, the vision sensors and the radar sensors generate image data of the surroundings. The image data is then placed in an image database of the memory device. It is later extracted from the recorded image data to generate the PMD.

As an example, features of the surroundings, which are extracted from the recorded image data, includes speed limit signage data, traffic light location data, speed camera location data as well as other road signage data.

When a map supplier provides a new map data, the PMD can also be used to complement the new map data.

In another aspect of the application, the navigation device is used to differentiate between two stacked parallel expressways. The stacked parallel expressways appear as one single road in a 2D (two-dimensional) map and the location information from the GPS receiver often does not differentiate between the parallel expressways.

Before the vehicle reaches the parallel expressways, the navigation device identifies the road and the road lane on which the vehicle is travelling. The navigation device also identifies changes of the road lanes. When the vehicle reaches the parallel expressways, the navigation device is then able to determine on which of the parallel expressway the vehicle is travelling using these identified data.

This differentiation is unlike other differentiations, which uses an accelerometer. The use of the accelerometer would require an additional piece of hardware that increases cost of the navigation device. In contrast, the ADAS is readily available in many vehicles and would increase cost of the navigation device.

The navigation device can also provide information about the parked location of the vehicle in a covered parking facility. The navigation device determines the location of vehicle using the GPS satellite signals before the vehicle enters the parking facility. The parking facility may be covered such that the navigation device does not receive the GPS satellite signals inside the parking facility.

The vehicle then enters the parking facility and travels to its parking lot while the vision sensors detect the turning movements of the vehicle in the parking facility. The navigation device also receives speed information of the vehicle in the parking facility. Using the detected turning movements, the previously known location of the vehicle outside the parking facility, as well as the speed of the vehicle inside the parking facility, the navigation device then determines its parking location. The navigation device later sends the parking location information to the driver via a communication technique, such as Bluetooth.

The navigation device can also provide digital pictures of its parking lot for easy reference. The vision sensors take a picture of the vehicle parking lot as well as pictures of locations surrounding the parking lot. The navigation device may turn on the automobile headlight if the ambient light is low to brighten the areas around the vehicle for taking the pictures. These pictures are afterward sent to a mobile phone of a driver of the vehicle via Bluetooth or via other communication means. Afterwards, the driver is able to locate the vehicle easily using the above sent information without needing to remember the parking location. This is especially useful when the parking facility has a large number of parking lots.

The navigation device provides navigation teleconferencing using a video feed. The vision sensors provide a stream of images of the front of the vehicle. These images are then sent to another destination to seek advice or guidance regarding navigation to a desired location. The map data may have information regarding its present location because the present location is new. Because of this, the map data may be used to provide guidance to the desired location.

BRIEF DESCRIPTION OF THE DRAWINGS

The invention and the technical field will be explained in more detail below on the basis of the figures. The figures show particularly preferred exemplary embodiments, to which the invention is however not restricted. In particular, it should be noted that the figures and, in particular, the illustrated proportions are merely schematic. In the figures.

DETAILED DESCRIPTION OF THE PRESENTLY PREFERRED EMBODIMENTS

In the following description, details are provided to describe embodiments of the application. It shall be apparent one skilled in the art, however, that the embodiments may b' practiced without such details.

Some parts of the embodiments have similar parts. The similar parts may have the same names or the similar part numbers. The description of one similar part also applies by reference to other similar parts, where appropriate, thereby reducing repetition of text without limiting the disclosure.

Figure 1:
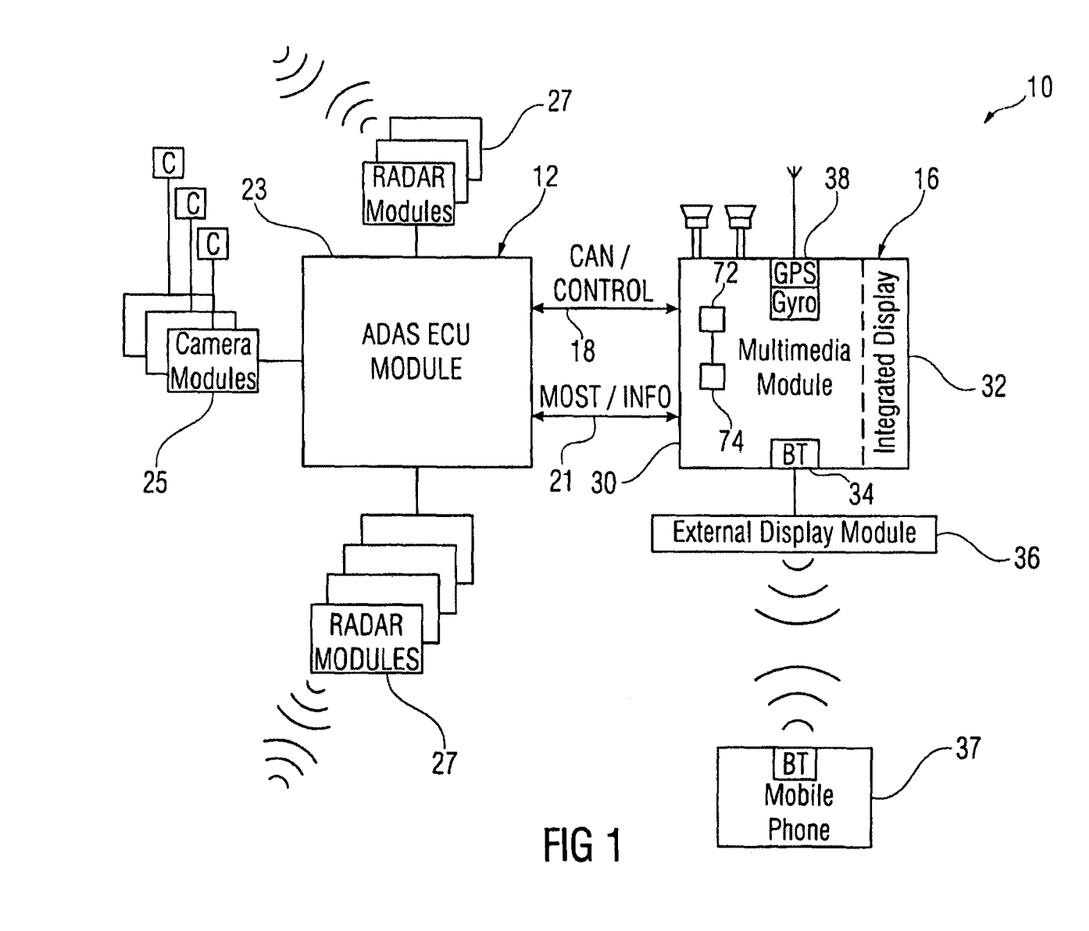
FIG. 1 illustrates functional blocks of a navigation device.

FIG. 1 shows functional blocks of a navigation device 10. The navigation device 10 includes an ECU (Engine Control Unit) unit 12 of an ADAS (Advance Driver Assistance System). The ADAS ECU unit 12 is connected communicatively to a multimedia navigation unit 16 by a MOST (Media Oriented Systems Transport) data bus 18 and by a CAN (Controller Area Network) data bus 21.

The ADAS ECU unit 12 includes an ADAS module 23, a plurality of cameras (i.e., vision sensors) 25, and a plurality of radar sensors 27, wherein the cameras 25 and the radar sensors 27 are connected to the ADAS module 23.

The navigation unit 16 includes a multi-media module 30. The multi-media module 30 has an integrated display 32, a Bluetooth (BT) communication port 34, and a GPS (Global positioning system) receiver 38. The BT communication port 34 is connected to an external display module 36, which is communicatively connected to a BT communication port of a mobile phone 37.

The navigation unit 16 also includes a processor 72 and a memory device 74, wherein the processor 72 is connected to the memory device 74 and to other modules. The memory device 74 stores a database of map data.

Figure 2:
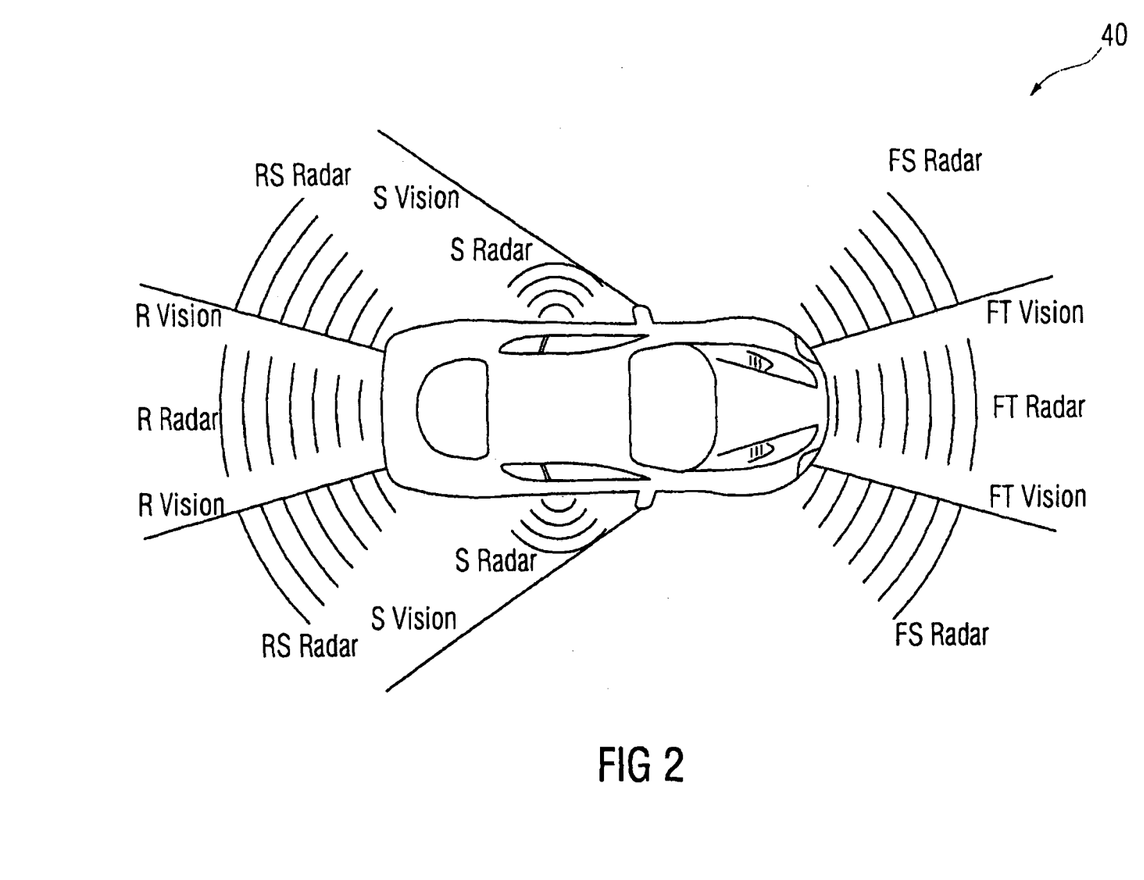
FIG. 2 illustrates an automobile that is installed with the navigation device of FIG. 1.

In use, the navigation device 10 is installed in an automobile or vehicle 40, which is illustrated in FIG. 2. The vehicle 40 travels on roads or expressways for transporting human beings or goods.

The MOST data bus 18 and the CAN data bus 21 allow transfer of data between the ADAS ECU unit 12 and the multimedia navigation unit 16. The data is also referred to here as information.

The vision sensors 25 are distributed around the vehicle 40 such that the vision sensors 25 are directed to the front, the rear, the left rear side, and the right rear side of the vehicle 40, as shown in FIG. 2. The vision sensors 25 take digital visual images or pictures of objects that placed in front of the vision sensors 25. The vision sensors 25 also transmit data of the digital visual images to the ADAS module 23.

In particular, the vision sensors 25 are directed to take digital visual images of the road and road lanes on which the vehicle 40 is placed. The vision sensors 25 are also directed to take digital visual images of features of the road surrounding the vehicle 40, such as traffic lights and road signage.

Similarly, the radar sensors 27 are distributed around the vehicle 40, wherein the radar sensors 27 are directed to the front, the front left side, the front right side, the rear, the rear left side, and the rear right side of the vehicle 40, as illustrated in the FIG. 2. The radar sensors 27 generate radio waves and receive the radio waves reflected by objects that are placed in front of the radar sensors 27. The reflected radio waves are used to form radio wave images of the objects. The radar sensors 27 also transmit data of the radio wave images to the ADAS module 23. The vision sensors 25 also transmit data of the digital visual images to the ADAS module 23.

Specifically, the radar sensors 27 are directed to take digital radio waves images of the road on which the vehicle 40 is placed. The radar sensors 27 are also directed to take digital radio waves images of features of the road surrounding the vehicle 40.

In a general sense, the vision sensors 25 include infrared sensors and camera sensors.

The GPS receiver 38 receives signals from GPS satellites when an unobstructed line of sight exists between the GPS satellites and the GPS receiver 38. The GPS receiver 38 also transmits location data of the navigation device 10, wherein the location data are derived from these satellite signals.

The processor 72 uses the received satellite signals to determine the location of the vehicle 40, which can be located on a part of a certain road. The processor 72 also uses image data from the ADAS module 23 to detect which lane of the road that the vehicle 40 is presently located.

In one implementation, the GPS receiver provides location data with an accuracy of a few hundred meters. Coupling this location data with the image data from the ADAS module 23, the processor 72 can determine the position of the vehicle 40 with an accuracy of a few meters.

The map data of a region includes geographical positional data of locations of the region and routing information among the locations.

The processor 72 uses the GPS receiver location data and the ADAS image data to determine the present location of the vehicle 40. The processor 72 also determines a route to a destination from the present location. The processor 72 provides audio and visual route guidance to a user of the vehicle 40 for reaching the destination. The guidance includes instructions to move the vehicle 40 to the left or the right in order to position the vehicle 40 for entering another road.

The processor 72 also uses data from the ADAS 23 to determine the turning motions of the vehicle 40. The processor 72 can determine whether the vehicle 40 is turning to the left or to the right.

The processor 72 also uses data from the ADAS 23 to determine objects around the vehicle 40, such as speed limit signage, traffic light, speed camera, and other road signage.

The processor 72 can also use information received from the radar sensors 27 to increase reliability of the information provided by the vision sensors 25. This is because the radio wave images are mostly unaffected by bad weather conditions while the visual images can be affected by bad weather conditions. In effect, this allows the information provided by the vision sensors 25 to be resilience or accurate even during changing weather conditions.

The processor 72 can also use image data from the ADAS module 23 to provide vehicle features such as Adaptive Cruise Control (ACC), Blind Sport Detection (BSD), Rear Cross Traffic Alert (RCTA), Emergency Brake Assist (EBA), Intelligent Headlamp Control (IHC), Lane Departure Warning (LOW), and Traffic Sign Recognition (TSR).

The Emergency Brake Assist (EBA) refers to an automobile braking technology that increases that increases braking pressure in an emergency.

The Blind Sport Detection (BSD) provides warning to the driver when there are vehicles in the blind spot of the sideview mirror of the vehicle.

The Adaptive Cruise Control (ACC) uses radar sensors for monitoring the vehicle in front and for adjusting the speed of the vehicle to keep it at a preset distance behind the vehicle ahead, even in most fog and rain conditions. When the traffic begins to move again, the Adaptive Cruise Control (ACC) accelerates the vehicle up to the preferred cruising speed if possible. In other words, the Adaptive Cruise Control (ACC) controls the stop and go of the vehicle.

The Lane Departure Warning (LDW) provides warning a driver when the vehicle begins to move out of its lane, unless a turn signal is switched on in the direction of the vehicle movement.

The Traffic Sign Recognition (TSR) allows a vehicle to recognize the traffic signs on the road, such as speed limit, children, or turn ahead traffic signs.

The Traffic Sign Recognition (TSR) identifies traffic signs and then displays them on the instrument panel of the vehicle. The Traffic Sign Recognition (TSR) may flash the display when the vehicle is over the speed limit for helping the driver to drive legally and safely.

The Intelligent Headlamp Control (IHC) monitors oncoming vehicles for controlling the headlamp of the vehicle such that the headlamps provide lighting while its high beams do not blind other road users.

In one implementation, the vision sensors 25 include infrared sensors that are used for providing Emergency Brake Assist (EBA).

The vision sensors 25 also include camera sensors that are used for providing Lane Departure Warning (LDW), Traffic Sign Recognition (TSR), and Intelligent Headlamp Control (NC).

The radar sensors 27 include mid-range to long-range radar sensors with operating frequency of 77 GHz that are used for providing Adaptive Cruise Control (ACC) and for providing Emergency Brake Assist (EBA).

The radar sensors 27 include short-range radar sensors with operating frequency of 24 GHz that are used for providing Blind Sport Detection (BSD).

The integrated display 32 acts to display navigation guidance information for a user of the navigation device 10.

The BT communication port 34 transfers information between the multi-media module 30 and the mobile phone 37 through the display module 36.

Figure 3:
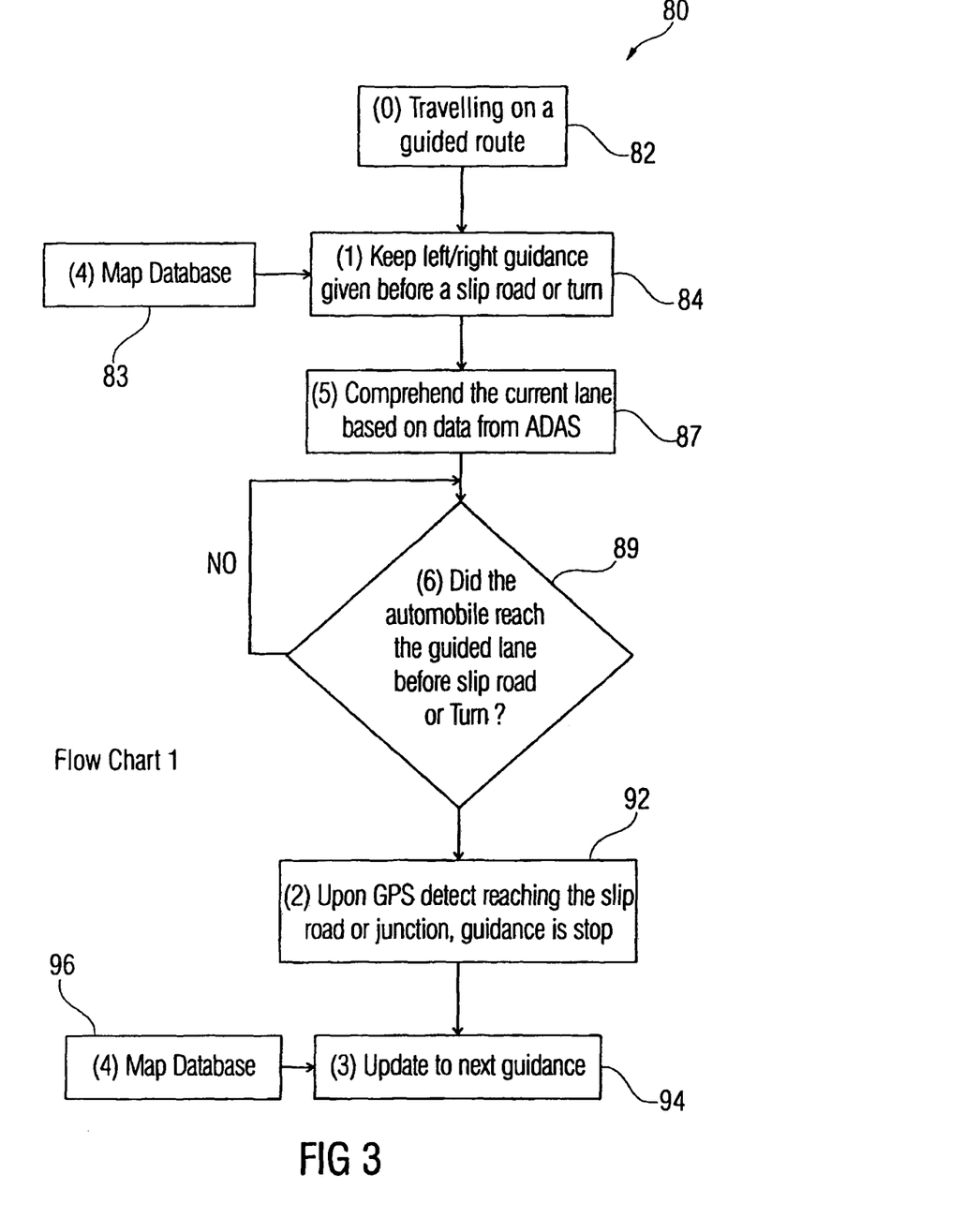
FIG. 3 illustrates a flow chart of the navigation device of FIG. 1 for determining road lanes of the automobile of FIG. 2.

FIG. 3 shows a flow chart 80 of the navigation device 10 for determining road lanes of the automobile 40. The road lanes are determined using the image data of the ADAS module 23.

The flow chart 80 shows a step 82 of a driver driving the vehicle 40 on a road or expressway. The flow chart 80 also shows a step 83 of the navigation device 10 using the map database to provide route guidance instructions to the driver. The route guidance instructs the driver to move the vehicle 40 to the left or to the right. This moving is intended to position the vehicle 40 for turning to a slip road or for turning at a road junction, in order to enter another road.

The steps 82 and 83 are then followed by a step 84 of the driver moving the vehicle 40 to the left or to the right, in accordance with the provided route guidance.

The navigation device 10 then comprehends or checks which road lane that the vehicle is positioned currently, in a step 87. This checking is done by determining the currently positioned road lane based on the image data from the ADAS module 23. The determination allows the navigation device 10 to know actually where the vehicle 40 is positioned. It also knows whether the vehicle 40 has moved as instructed by the navigation device 10.

The checking ceases when data from the GPS receiver 38 indicate that the vehicle 40 has reached the slip road or junction, as shown in a step 92.

When the vehicle 40 is travelling on another road, the navigation device 10 uses data from map database in a step 96 and continues to provide route guidance to a further road, as shown in a step 94.

In short, the flow chart 80 provides a closed loop guidance in that the step 87 provides the checking of on which road lane the automobile 40 is actually located. In effect, the navigation device 10 knows whether the vehicle 40 is positioned correctly. This is especially important where the road has many turns and junctions that the driver has to navigate. By detecting the current road lane and then providing the corresponding advice for navigating, potential accidents can be avoided. This method of navigation also reduces driving stress while allowing the driver to relax.

Such guidance is different from guidance provided by other navigation devices that is an open-loop system.

Figure 4:
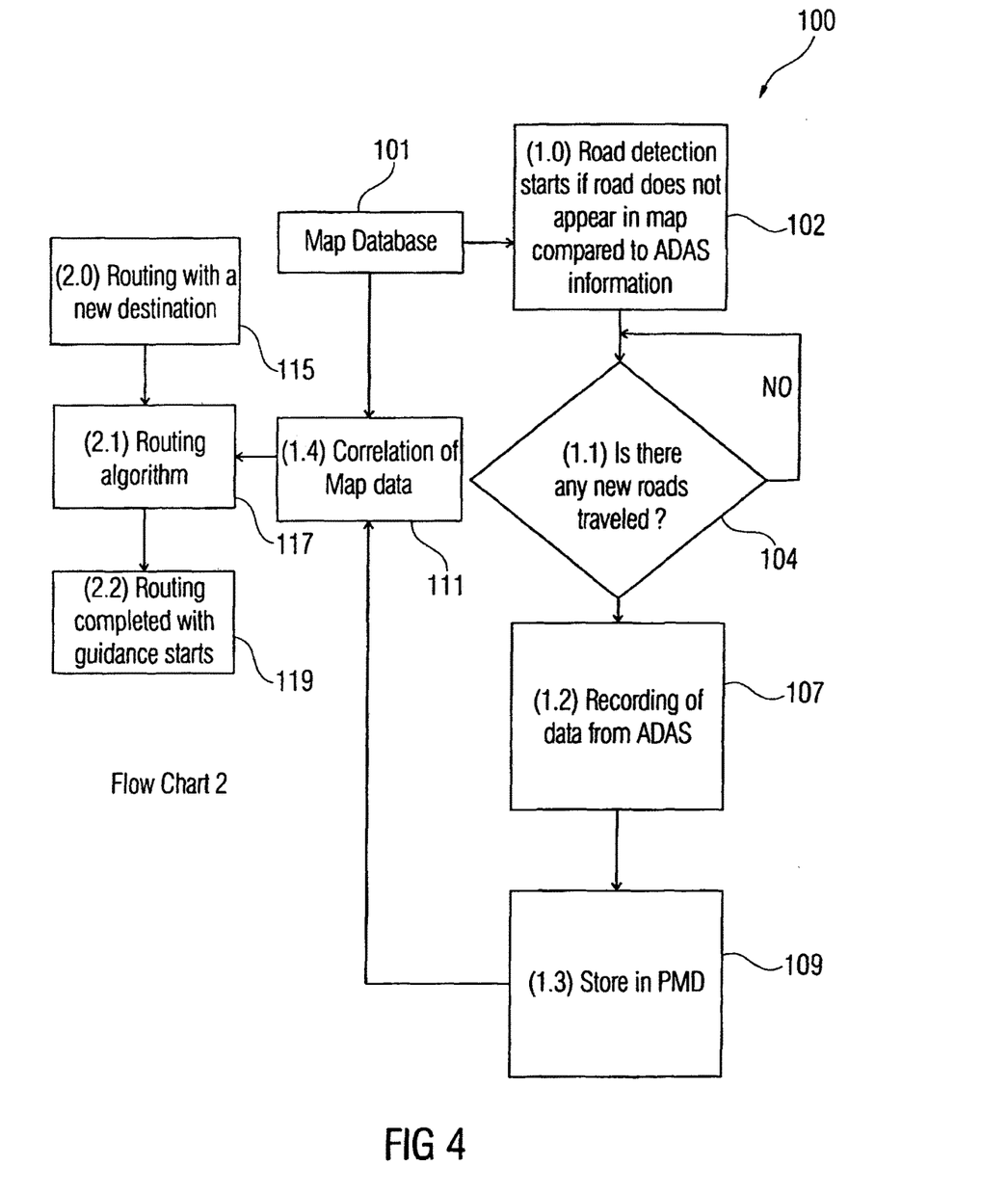
FIG. 4 illustrates a flow chart of the navigation device of FIG. 1 for generating a Personalized Map Database (PMD)

FIG. 4 shows illustrates a flow chart 100 of the navigation device 10 for generating a Personalized Map Database (PMD) for improving map guidance. The PMD is generated using the map data and the ADAS image data. The flow chart 100 acts to populate the PMD with live data.

Initially, the navigation device 10 receives the map data in a step 101. The navigation device 10 then starts road detection and road data collection in a step 102 if the location data of the vehicle 40, which is derived from the ADAS image data and the GPS receiver location data, is not present in the map data.

The road detection continues in a step 104, as long as the present vehicle location data is not present in the map data. The processor 72 then records the ADAS image data and the GPS receiver location data. The processor 72 later places the recorded data in the PMD, in a step 109.

The processor 72 afterward correlates or compares the PMD data with the map data in a step 111 to determine similarities or differences. The similarities affirm which part of the map data is correct while the differences indicate which of the map data needs to be corrected and replaced with the PMD data. The identified differences are then recorded for use together with the map data to improve route navigation device making the route navigation more intelligent.

The comparison may show changes of the road that are not shown in the map data. The comparison may also show new information, such as new road signage, which are not present in the map data and which can be used to complement and improve the map data. This compared information are then stored in the PMD for later use. The navigation system 10 then provides guidance according to the map data with the PMD data.

The guidance includes generation of a route to a destination, in a step 115. This also includes the use of a routing algorithm to generate the route, in a step 117. Following the step 117, a step of providing audio and visual guidance is then performed, in a step 119.

As an example, when the automobile 40 travels on a new road that is not present in the map database, the processor 72 detects this and records the detected vision sensor information and the detected radar information together with the GPS receiver location data in the PMD. The navigation device 10 later uses information from the map data together with the recorded PMD data, and not just the original map data, for guidance.

This method provides a self-learning system and also replaces the need for map updates, which the map vendor may provide infrequently.

The PMD is kept as a separate database such that it can be used with the new map data, whenever the new map data is provided from the vendor.

Figure 5:
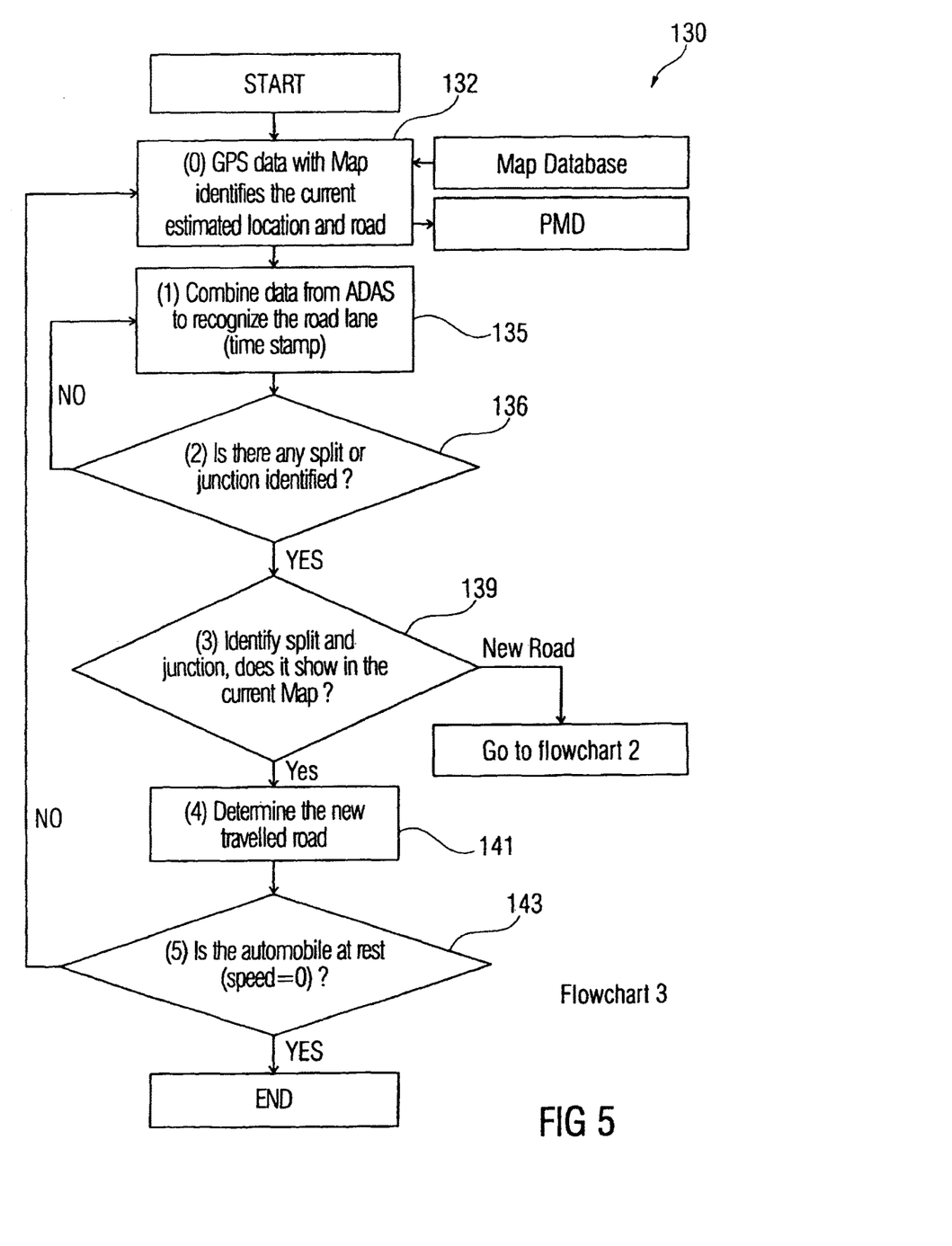
FIG. 5 illustrates a flow chart of the navigation device of FIG. 1 for differentiating between two stacked parallel roads while avoiding use of the accelerometer.

FIG. 5 shows a flow chart 130 of the navigation device 10 for differentiating between two stacked parallel roads. The differentiating does not require the use an accelerometer.

The flow chart 130 includes a step 132 of identifying the present location of the automobile 40 using the GPS receiver data. The processor 72 also uses the ADAS image data to recognize the road lane where the automobile is located, in a step 135. The step 135 also includes adding a time stamp or time record to the location data of the automobile 40 for keeping a time location record of the automobile 40.

After this, the ADAS image data is searched for a splitting of the road to the two different stacked parallel roads, in a step 136. If a road split is detected in the ADAS image data, the existence of this road split in the map data is checked, in the step 139. If this road split is not shown in the map data, this information is added to the PMD.

By noting the route taken after the road split, the parallel road taken by the vehicle 40 can be determined. The parallel road can also be determined based on its road feature, which can be identified using the ADAS image data.

Following this, the road for travelling after the road split is determined, in a step 141. A step 143 of continuing to identify the current location of the vehicle 40 is then performed. This step 143 is performed until the automobile 40 stops moving. The step 143 continues to be performed when the automobile 40 starts moving again.

This way of navigating uses data from the GPS receiver 38 together with the image data from the ADAS module 23 to detect roads and lanes of the roads traveled by the automobile 40. The navigation device 10 uses the ADAS image data to identify the start of stacked parallel roads. The navigation device 10 also uses the ADAS image data to differentiate between stacked parallel roads. The differentiation is possible because the different stacked parallel roads have different visual features. In this manner, the navigation device 10 provides clear route guidance through the stacked parallel roads.

The navigation avoids use of the accelerometer for providing gravitational level information for differentially between stacked roads parallel by the automobile 40.

Figure 6:
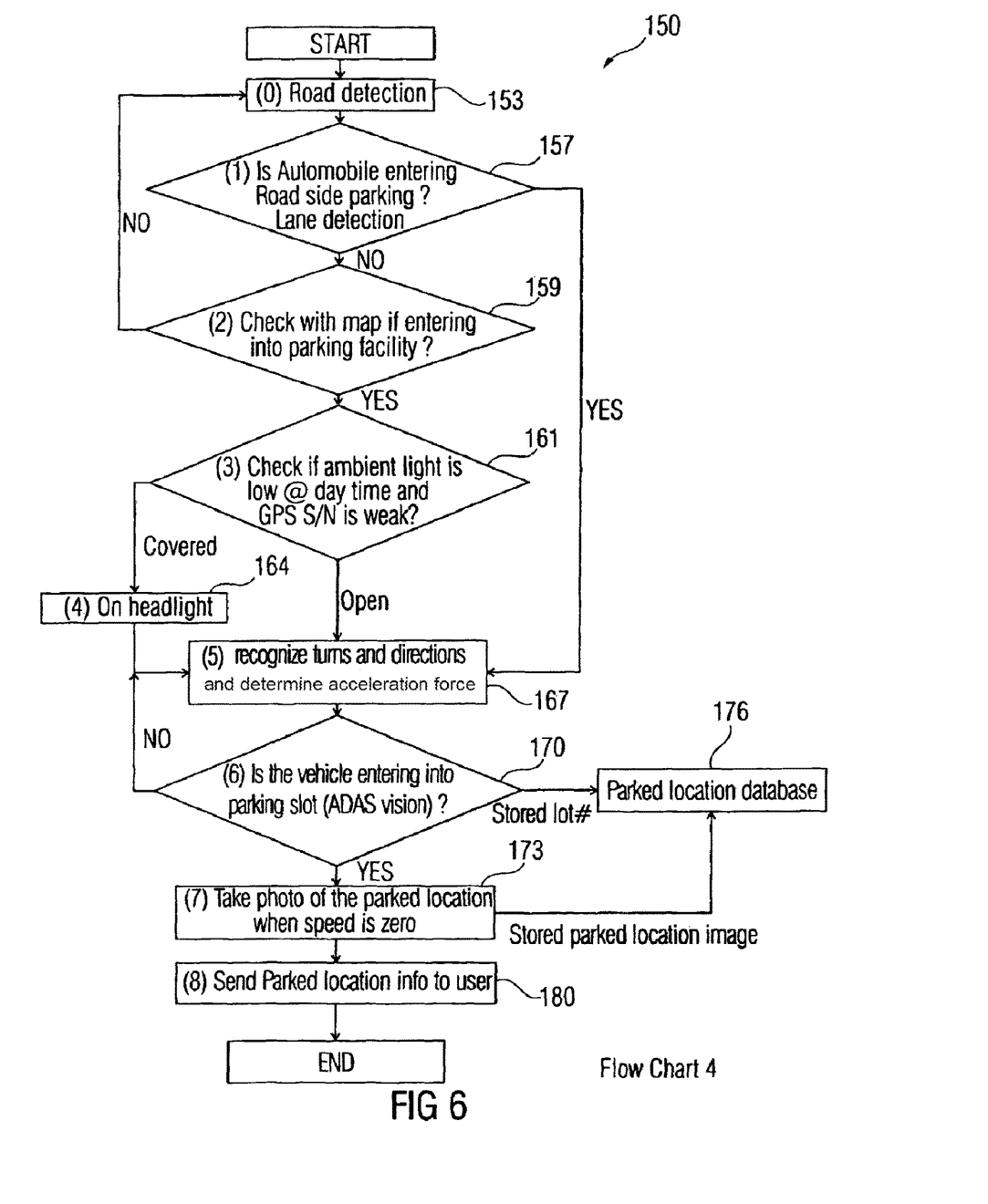
FIG. 6 illustrates a flow chart of the navigation device of FIG. 1 for determining a location of the automobile in a covered facility and for locating the automobile 40 in a parking area.

FIG. 6 shows a flow chart 150 of the navigation device 10 for determining a location of the automobile 40 in a covered facility and for locating the parking lot of the automobile 40. The steps for determining a parking location of the automobile 40 in the covered facility are described below.

The processor 72 detects the road on which the vehicle 40 is placed using the ADAS image data, in a step 153. After this, the processor 72 checks whether the automobile 40 is performing parking, in a step 157. The processor 72 also checks whether, accordingly to the map data, the automobile 40 is entering a covered parking facility, in a step 159.

The processor 72 then checks whether the ambient light is low and whether the signals received by the GPS receiver are weak, in a step 161. In a covered parking facility, the ambient light may be low and the UPS receiver signals may be weak. If the ambient light is low, the processor 72 switches on the headlights of the automobile 41 to facilitate the taking of the ADAS image data, in a step 164.

The processor 72 later uses the ADAS image data in the parking facility for determining the turning motions of the automobile 40, in a step 167.

The processor 72 may also use data from a gyroscope to determine the turning motions, although this is not necessary here, as the image data from the ADAS module 23 can perform this.

The location of the automobile can then be calculated based on the last known location of the automobile, which is outside the covered facility, based on the recorded turning motions of the automobile in the covered facility, and based on the speed of the automobile in the covered facility.

The steps for locating the parking lot of the vehicle 40 are described below.

The processor 72 later determines whether the automobile 40 is entering a parking lot using image data from the ADAS module 23, in a step 170. The processor 72 then takes a picture of the parking lot, using the ADAS module 23, before the automobile stops moving, in a step 173. The picture is derived from the image data of the ADAS module 23. The processor 72 later stores the photograph of the parking lot in a parking location database, in a step 176.

Following this, the processor 72 sends the parking lot photograph to the mobile phone 37 of the driver via a communication method, such as via Bluetooth or USB technology, in a step 180. The mobile phone 37 is illustrated in FIG. 1. The driver can afterward locate easily the automobile 40 in the parking area by using the parking lot photograph.

A method of the navigation device 10 to provide navigation using teleconferencing is described below. The teleconferencing uses images of the ADAS module 23.

This method is intended for a driver at a particular location who wants to reach a certain destination while the map data of the navigation device 10 does not have data of the present location and/or data of the desired destination.

The navigation device 10 sends a digital picture of the current location to staff at a routing service location. The navigation device 10 also informs the service staff of its destination. The service staff then provides route guidance to the driver according the received information. The communication between the navigation device 10 and the service staff can be done using mobile phone technology.

This method allows the driver to reach the destination without distracting the driver.

This method is especially useful where no specific Points of Interest (POI) or landmarks exist around the destination.

In another embodiment, both voice and video data are streamed together using data packet technology via a communication channel from the navigation device 10 to a receiver. This allows the receiver to receive live images as well while also allowing the driver to receive voice guidance.

In summary, these embodiments provide a navigation product with a GPS receiver, vision sensors and radar sensors for navigation of automobiles. The vision sensors and the radar sensors can be a part of an ADAS, which exists in many automobiles. Present ADAS often merely provides multiple safety functions for the automobile uses vision and radar methodology.

This navigation product provides location data with accuracy better than location data provided by the GPS receiver.

The vision sensors enable differentiation between parallel highways without use of the accelerometer.

The vision sensors also recognize accurately the roads taken by the automobile for matching with the map data of the navigation product. This matching is then used to improve profiles of the roads for improving route navigation. The matching can also remove the need for map data updates.

The vision sensor also provides navigation video conferencing for showing the automobile current location to another location for seeking guidance to a desired location.

Although the above description contains much specificity, this should not be construed as limiting the scope of the embodiments but merely providing illustration of the foreseeable embodiments. The above stated advantages of the embodiments should not be construed especially as limiting the scope of the embodiments but merely to explain possible achievements if the described embodiments are put into practice. Thus, the scope of the embodiments should be determined by the claims and their equivalents, rather than by the examples given.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method of vehicle navigation guidance, the method comprising:
   receiving via a GPS receiver satellite positioning signals including at least three satellite positioning data;
   receiving road marking data from a driver assistance device;
   calculating a first position of a vehicle according to the at least three satellite positioning data and according to the road marking data;
   determining a turning action of the vehicle according to the road marking data without a gyroscope;
   determining a presence of two parallel roads and gravitational level information of the vehicle according to the road marking data without an accelerometer using data from at least one of an image sensor and a radar sensor; and
   calculating a second position of the vehicle on one of the two parallel roads according to the first position, according to the turning action, and according to the gravitational level information,
   providing vehicle navigation guidance based at least in part on the determined second position.

2. The method according to claim 1, further comprising determining a changing of lane of the vehicle according to the road marking data.

3. The method according to claim 1, further comprising generating a map database that comprises:
   receiving image data from the driver assistance device;
   detecting at least one object data surrounding the vehicle in the image data;
   assigning a position data to the object data; and
   storing the object data with the position data.

4. The method according to claim 3, wherein the detecting of the at least one object data comprises detecting a bus stop.

5. The method according to claim 3, wherein the detecting of the at least one object data comprises detecting a building of interest.

6. The method according to claim 1, further comprising a video conferencing that comprises:
- transmitting an image data of the surrounding of the vehicle;
- receiving the image data by a routing service location; and
- transmitting a routing guidance according the image data from the routing service location to the vehicle.

7. A vehicle navigation device for providing route guidance, the vehicle navigation device comprising:
- a satellite positioning data receiver;
- a driver assistance device image data receiving port;
- a navigation display port;
- a navigation audio port; and
- a processor communicatively connecting to the satellite positioning receiver, to the driver assistance device image data receiver port, to the display port, and to the audio port, wherein
the vehicle navigation device is configured to provide:
- route guidance,
- a data collection mode,
- a first position determination mode, and
- a second position determination mode, in the data collection mode,
- the satellite positioning data receiver receives at least three satellite positioning data, and the driver assistance device image data receiving port obtains road marking data, in the first position determination mode,
- the processor calculates a first position of a vehicle according to the at least three satellite positioning data and the road marking data, and in the second position determination mode,
- the processor determines at least one turning action of the vehicle according to the road marking data,
- the processor determines a presence of two parallel roads and gravitational level information of the vehicle according to the road marking data using data from at least one of an image sensor and a radar sensor, and
- the processor calculates a second position on one of the two parallel roads including of the vehicle according to the first position, to the turning action, and to the gravitational level information.

8. The vehicle navigation device according to claim 7, wherein the second position determination mode further comprises the processor determining a tilt of the vehicle according to a direction of the gravitational level information.

9. The vehicle navigation device according to claim 7, wherein the vehicle navigation device is configured to further provide a map generation mode,
in the map generation mode,
- the processor receives image data from the driver assistance device image data receiving port,
- the processor detects at least one object data in the image data,
- the processor assigns a position data to the object data, and
- the processor stores the object data with the position data.

10. A vehicle comprising:
a driver assistance device that comprises at least two vision image sensors for providing image data and a navigation device according to claim 7 connected to the driver assistance device.

11. The vehicle according to claim 10, wherein the vision image sensors comprise an infrared sensor.

12. The vehicle according to claim 10, wherein the vision image sensors comprise a camera sensor.

13. The vehicle according to claim 10, wherein the driver assistance device further comprises at least two radar image sensors for providing image data.

14. The vehicle according to claim 10, wherein the image data comprises road marking data.

15. The vehicle according to claim 10, wherein the image data comprises data of objects surrounding the vehicle.

16. The method according to claim 1, further comprising providing navigation guidance in a covered facility where satellite signals cannot be received based at least in part on the determined second position.

* * * * *